UNITED STATES PATENT OFFICE.

CHARLES W. MERRILL, OF LEAD, SOUTH DAKOTA.

PROCESS OF TREATING PRECIOUS-METAL-BEARING MATERIALS.

No. 825,920.     Specification of Letters Patent.     Patented July 17, 1906.

Application filed October 31, 1905. Serial No. 285,344.

*To all whom it may concern:*

Be it known that I, CHARLES W. MERRILL, a citizen of the United States, and a resident of Lead, Lawrence county, South Dakota, have invented a new and useful Improvement in Processes of Treating Precious-Metal-Bearing Materials, of which the following is a specification.

My invention relates to an improvement in the art of treating precious-metal-bearing materials, particularly those ores or tailings which contain reducing salts or minerals, with cyanogen-bearing solutions.

I have heretofore obtained Letters Patent for improvements in treating that class of ores and tailings which contain reducing salts or minerals with cyanogen-bearing solutions by filling the interstitial space with an oxidizing agent preliminarily to contact with a cyanid solution, and I have heretofore and on or about the 7th day of July, 1905, made application, Serial No. 268,729, for a patent in United States Patent Office for a process for treating precious-metal-bearing materials after first contact with a cyanogen-bearing solution by withdrawing the cyanid solution and filling the interstitial space with an oxidizing agent under pressure greater than that of the atmosphere in a closed container and then again subjecting the material to treatment with a cyanogen-bearing solution.

The present application relates to the method of treating such materials after the first contact with a cyanogen-bearing solution in any form of container by means of an oxidizing agent in the form of a solution of an alkali-metal or alkaline-earth-metal hypochlorite, such as hypochlorite of calcium.

As is well known, all methods of crushing ore are divided, generally speaking, into what is known as "wet" crushing and "dry" crushing, the former necessitating the presence of liquid in the material. The effect of the liquid being present with the mixed ore is generally incident to the operation and not essential, and hence in the various processes heretofore perfected by me prior to effecting oxidation the liquid is removed from the interstitial spaces of the mass by draining in any convenient manner the containers in which the same is collected, after which the interstitial spaces are filled with the oxidizing agent and the contact thus formed between the finely-divided metal-bearing material and the oxidizing agent is maintained until part or all of the reducing material has been oxidized.

The present invention consists, broadly, in using as an oxidizing agent in any form of container, whether open or closed, an alkali or alkaline-earth metal hypochlorite, such as hypochlorite of calcium. In practice the cyanid solution after the first contact with the precious-metal-bearing material is removed from the interstitial spaces of the crushed ore in the container by draining or otherwise. The solution of hypochlorite, preferably hypochlorite of calcium, which is obtainable, mixed with chlorid of calcium in the form of bleaching-powder in sufficient quantities at low cost, is introduced into the interstitial spaces of the mass in the container, the effect of which is that such particles of reducing material as may be there present are oxidized. Thereafter hypochlorite solution is displaced, and the particles within the container are subjected to further treatment with the cyanogen-bearing solution. The process can be conducted in any form of container to which the hypochlorite solution can be applied after the removal of the cyanogen-bearing solution from the interstitial spaces of the crushed ore contained therein, the effect of such application being to provide an envelop of oxidizing agent around the particles of the crushed ore.

I claim as my invention—

1. The improvement in treating a precious-metal-bearing material with cyanogen-bearing solution after preliminary contact with such solution, consisting in removing the cyanogen-bearing solutions from the interstitial spaces of the crushed material, applying a solution of an alkali-metal or alkaline-earth-metal hypochlorite to said material and subsequently applying a cyanogen-bearing solution to said material.

2. The improvement in treating a precious-metal-bearing material with cyanogen-bearing solution after preliminary contact with such solution, consisting in removing the cyanogen-bearing solution from the interstitial spaces of the crushed material, applying a solution of an alkali-metal or alkaline-earth-metal hypochlorite to said material and subsequently applying a cyanogen-bearing solution to said material in one and the same container.

3. The improvement in treating precious-metal-bearing material containing reducing agents with cyanogen-bearing solutions consisting in first collecting the crushed material, applying a cyanogen-bearing solution to said material, subsequently removing said cyanogen-bearing solution from the interstitial spaces of said material, applying a solution of an alkali or alkaline-earth metal hypochlorite and subsequently applying a cyanogen-bearing solution to said material in one and the same container.

4. The improvement in treating precious-metal-bearing material containing reducing agents, with cyanogen-bearing solutions, consisting in first collecting the material in a container after preliminary contact with such solutions and after removal of any liquid when there present from the interstitial spaces of the crushed material, oxidizing all or part of the reducing agent by means of a solution of an alkali-metal or alkaline-earth-metal hypochlorite brought into contact with the material in the same container in which the subsequent contact with cyanogen-bearing solution is to take place, and subsequently applying a cyanogen-bearing solution to said material in said container.

In testimony that I claim the foregoing as my invention I have signed my name, in presence of two witnesses, this 27th day of October, 1905.

CHARLES W. MERRILL.

Witnesses:
  A. B. SCOTT,
  AVERILL P. CARTER.